(12) United States Patent
Cutler

(10) Patent No.: US 7,936,374 B2
(45) Date of Patent: May 3, 2011

(54) SYSTEM AND METHOD FOR CAMERA CALIBRATION AND IMAGES STITCHING

(75) Inventor: Ross Cutler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 759 days.

(21) Appl. No.: 11/430,344

(22) Filed: May 9, 2006

(65) Prior Publication Data

US 2006/0268131 A1 Nov. 30, 2006

Related U.S. Application Data

(63) Continuation of application No. 10/177,315, filed on Jun. 21, 2002, now Pat. No. 7,259,784.

(51) Int. Cl.
*H04N 5/232* (2006.01)
(52) U.S. Cl. .............. 348/211.11; 348/211.8; 348/211.3
(58) Field of Classification Search ............ 348/239, 348/211.22, 211.8, 211.3
See application file for complete search history.

(56) References Cited

U.S. PATENT DOCUMENTS

| | | | |
|---|---|---|---|
| 3,118,340 A | 1/1964 | Iwerks | |
| 3,698,803 A | 10/1972 | Watanuki | |
| 4,626,893 A | 12/1986 | Yamanaka | .............. 348/176 |
| 5,313,308 A | 5/1994 | Hasegawa | |
| 5,504,524 A | 4/1996 | Lu et al. | .............. 348/223.1 |
| 5,539,483 A | 7/1996 | Nalwa | |
| 5,745,305 A | 4/1998 | Nalwa | |
| 5,793,527 A | 8/1998 | Nalwa | |
| 5,990,934 A | 11/1999 | Nalwa | |
| 6,005,611 A | 12/1999 | Gullichsen et al. | |
| 6,043,837 A | 3/2000 | Driscoll, Jr. et al. | |
| 6,075,905 A | 6/2000 | Herman | |
| 6,101,287 A | 8/2000 | Corum et al. | .............. 382/274 |
| 6,111,702 A | 8/2000 | Nalwa | |
| 6,115,176 A | 9/2000 | Nalwa | |
| 6,128,143 A | 10/2000 | Nalwa | |
| 6,141,145 A | 10/2000 | Nalwa | |
| 6,144,501 A | 11/2000 | Nalwa | |
| 6,175,454 B1 | 1/2001 | Hoogland et al. | |
| 6,195,204 B1 | 2/2001 | Nalwa | |
| 6,219,089 B1 | 4/2001 | Driscoll, Jr. et al. | |
| 6,219,090 B1 | 4/2001 | Nalwa | |
| 6,222,683 B1 | 4/2001 | Hoogland et al. | |

(Continued)

FOREIGN PATENT DOCUMENTS

JP 08-125835 5/1996

(Continued)

OTHER PUBLICATIONS

European Search Report, Application No. EP05111176S.3, completed Apr. 4, 2006, received Apr. 12, 2006.

(Continued)

*Primary Examiner* — Lin Ye
*Assistant Examiner* — Amy Hsu
(74) *Attorney, Agent, or Firm* — L. Alan Collins; Collins & Collins Incorporated

(57) ABSTRACT

A practical, real-time calibration of digital omnidirectional cameras in the areas of de-vignetting, brightness, contrast, and white balance control. Novel solutions for the color calibration of an omnidirectional camera rig, and an efficient method for devignetting images are presented. Additionally, a context-specific method of stitching images together into a panorama or a mosaic is provided.

21 Claims, 7 Drawing Sheets

U.S. PATENT DOCUMENTS

| | | |
|---|---|---|
| 6,285,365 B1 | 9/2001 | Nalwa |
| 6,295,085 B1 | 9/2001 | Munson |
| 6,313,865 B1 | 11/2001 | Driscoll, Jr. et al. |
| 6,331,869 B1 | 12/2001 | Furlan et al. |
| 6,337,708 B1 | 1/2002 | Furlan et al. |
| 6,341,044 B1 | 1/2002 | Driscoll, Jr. et al. |
| 6,346,967 B1 | 2/2002 | Gullichsen et al. |
| 6,356,296 B1 | 3/2002 | Driscoll, Jr. et al. |
| 6,356,397 B1 | 3/2002 | Nalwa |
| 6,369,818 B1 | 4/2002 | Hoffman et al. |
| 6,373,642 B1 | 4/2002 | Wallerstein et al. |
| 6,385,349 B1 | 5/2002 | Teo |
| 6,388,820 B1 | 5/2002 | Wallerstein et al. |
| 6,392,687 B1 | 5/2002 | Driscoll, Jr. et al. |
| 6,424,377 B1 | 7/2002 | Driscoll, Jr. et al. |
| 6,426,774 B1 | 7/2002 | Driscoll, Jr. et al. |
| 6,459,451 B2 | 10/2002 | Driscoll, Jr. et al. |
| 6,466,254 B1 | 10/2002 | Furlan et al. |
| 6,472,665 B1 | 10/2002 | Ishisaka |
| 6,480,229 B1 | 11/2002 | Driscoll, Jr. et al. |
| 6,493,032 B1 | 12/2002 | Wallerstein et al. |
| 6,515,696 B1 | 2/2003 | Steinhauer et al. |
| 6,535,649 B1 * | 3/2003 | Chiu ............... 382/274 |
| 6,539,547 B2 | 3/2003 | Driscoll, Jr. et al. |
| 6,542,696 B2 | 4/2003 | Kindaichi |
| 6,583,815 B1 | 6/2003 | Lomax et al. |
| 6,593,969 B1 | 7/2003 | Morrow et al. |
| 6,597,520 B2 | 7/2003 | Wallerstein et al. |
| 6,628,825 B1 | 9/2003 | Yamazoe et al. ............ 382/167 |
| 6,677,981 B1 | 1/2004 | Mancuso |
| 6,700,711 B2 | 3/2004 | Nalwa |
| 6,741,250 B1 | 5/2004 | Furlan et al. |
| 6,756,990 B2 | 6/2004 | Koller |
| 6,788,340 B1 | 9/2004 | Chen et al. ............... 348/229.1 |
| 6,795,106 B1 | 9/2004 | Cooper |
| 6,801,257 B2 * | 10/2004 | Segev et al. ............... 348/296 |
| 6,885,509 B2 | 4/2005 | Wallerstein et al. |
| 6,917,702 B2 * | 7/2005 | Beardsley ............... 382/154 |
| 6,924,832 B1 | 8/2005 | Shiffer et al. |
| 6,943,829 B2 * | 9/2005 | Endo et al. ............... 348/207.11 |
| 6,974,973 B2 | 12/2005 | Rossi |
| 7,015,954 B1 | 3/2006 | Foote |
| 7,020,337 B2 | 3/2006 | Viola |
| 7,031,499 B2 | 4/2006 | Viola |
| 7,084,904 B2 * | 8/2006 | Liu et al. ............... 348/218.1 |
| 7,099,510 B2 | 8/2006 | Jones |
| 7,197,186 B2 | 3/2007 | Jones |
| 7,212,651 B2 | 5/2007 | Viola |
| 7,298,964 B2 * | 11/2007 | Ishikawa et al. ............... 386/117 |
| 7,382,383 B2 | 6/2008 | Shiomi |
| 7,492,411 B2 * | 2/2009 | Classen et al. ............... 348/362 |
| 2001/0020672 A1 | 9/2001 | Hegihara |
| 2002/0034020 A1 | 3/2002 | Wallerstein et al. |
| 2002/0041324 A1 | 4/2002 | Satoda |
| 2002/0063802 A1 | 5/2002 | Gullichsen et al. |
| 2002/0094132 A1 | 7/2002 | Hoffman et al. |
| 2002/0154417 A1 | 10/2002 | Wallerstein et al. |
| 2003/0052980 A1 | 3/2003 | Brown |
| 2003/0103156 A1 | 6/2003 | Brake |
| 2003/0142402 A1 | 7/2003 | Carbo, Jr. et al. |
| 2003/0146982 A1 * | 8/2003 | Tindall ............... 348/223.1 |
| 2003/0184660 A1 | 10/2003 | Skow ............... 348/223.1 |
| 2003/0193606 A1 | 10/2003 | Driscoll, Jr. et al. |
| 2003/0193607 A1 | 10/2003 | Driscoll, Jr. et al. |
| 2003/0210329 A1 * | 11/2003 | Aagaard et al. ............... 348/159 |
| 2003/0220971 A1 | 11/2003 | Kressin |
| 2004/0008407 A1 | 1/2004 | Wallerstein et al. |
| 2004/0008423 A1 | 1/2004 | Driscoll, Jr. et al. |
| 2004/0021764 A1 | 2/2004 | Driscoll, Jr. et al. |
| 2004/0252384 A1 | 12/2004 | Wallerstein et al. |
| 2004/0254982 A1 | 12/2004 | Hoffman et al. |
| 2005/0046703 A1 | 3/2005 | Cutler |
| 2005/0078172 A1 | 4/2005 | Harville |
| 2005/0117034 A1 | 6/2005 | Cutler |
| 2005/0151837 A1 | 7/2005 | Cutler |
| 2005/0285943 A1 | 12/2005 | Cutler |
| 2006/0198554 A1 | 9/2006 | Porter |

FOREIGN PATENT DOCUMENTS

| | | |
|---|---|---|
| JP | 10-124704 | 5/1998 |
| JP | 2000-089703 | 3/2000 |
| JP | 2000-293660 | 10/2000 |
| JP | 2001-094857 | 4/2001 |
| JP | 2003-018561 | 1/2003 |
| WO | WO 98/47291 | 10/1998 |
| WO | WO9847291 | 10/1998 |
| WO | WO 00/11512 | 3/2000 |
| WO | WO02/090887 A | 11/2002 |
| WO | WO 2004/004320 | 1/2004 |
| WO | WO2004004320 | 1/2004 |
| WO | WO 2004/111689 A2 | 12/2004 |
| WO | WO 2004/112290 A2 | 12/2004 |
| WO | WO 2005/002201 A2 | 1/2005 |

OTHER PUBLICATIONS

Charfi, M., A. Nyeck, A. Tosse "Focusing Criterion", Electronic Letters, vol. 27, No. 14, pp. 1233-1235.

Choi, K., S: Ko, "New Autofocusing Technique Using the Frequency Selective Weighted Median Filter for Video Cameras", IEEE Transactions on Consumer Electronics, vol. 45, No. 3, Aug. 1999.

Davis, J. Mosaics of scenes with Moving Objects IEEE Comp.Soc. Conf. on Computer Vision and Pattern Recognition, 1998.

Glenn, E., Healey, K. Raghava, "Radiometric CCD Camera Calibration and Noise Estimation", IEEE Trans. PAMI, 16(3)267-276, 1994.

Hasler, D. and S. Susstrunk, "Colour Handling in Panoramic Photography", Proceedings of SPIE vol. 4309, 2001.

Kang, S.B. and R Weiss. "Can We Calibrate a Camera using an Image of a Flat, Textureless Lambertian Surface", ECCV, 2000.

Kemberova, G. R. Bajcsy, The Effect of Radiometric Correction on Mutticamera Algorithms' Technical Report MS-CIS-97-17, 1997.

Li, Zhang, Zhang. "Real-Time Multi-View Face Detection", Face and Gesture Recognition, 2002, Washington D.C.

Majurnder, LA., Z. He, H. Towles, G. Welch, "Achieving Color Uniformity Across Multi-Projector Displays", IEEE Visualization 2000.

Subbarao, M. and J. Tyann "Selecting the Optimal Focus Measure for Autofocusing and Depth-from-Focus", IEEE Transactions on PAMI, vol. 20, No. 8, Aug. 1998.

Szeliski, R. and H.-Y. Shue. Creating full view panoramic image mosaics and Environment Maps. Computer Graphics (SIGGRAPH '97), pp. 251-258, 1997.

Szeliski, R. Video mosaics for virtual environments. *IEEE Computer Graphics and Applications*, pp. 22-30, Mar. 1996.

Uyttendaela, M., A. Eden, and R. Szeliski. Eliminating ghosting and exposure artifacts in image mosaics. In IEEE Computer Society Conference on Computer Vision and Pattern Recognition (CVPR'2001), vol. II pp. 509-516, Kauai, Hawaii, Dec. 2001.

Widjaja, J. and S. Jutamulia, "Use of Wavelet Analysis for Improving Autofocusing Capability", Optics Communications 151, pp. 12-14, 1998.

J. Davis "Mosaics of scenes with moving objects", Proceedings of IEEE Computer Society Conference on Computer Vision and Pattern Recognition, Jun. 23-25, 1998, pp. 354-360.

Badros, G., Alan Borning, Kim Marriott, and Peter Stuckey. Constraint cascading style sheets for the web. In *ACM User Interface Software and Technology Conference Proceedings*, 1999.

Badros, G., Jeffrey Nichols, and Alan Borning. Scwm—an intelligent constraint-enabled window manager. In *AAAI Smart Graphics Conference Proceedings*, 2000.

Borning, A., Richard Lin, and Kim Marriott. Constraints for the web. In *ACM Multimedia Conference Proceedings*, pp. 173-182, Nov. 1997.

Borning, A., Richard Lin, and Kim Marriott. Constraint-based document lay-out for the web. *Multimedia Systems*, 8:177-189, 2000.

Borning, A., Kim Marriott, Peter Stuckey, and Yi Xiao. Solving linear arithmetic constraints for user interface applications. In *ACM User Interface Software and Technology Conference Proceedings*, pp. 87-96, Oct. 1997.

Furuta, R., J. Schofield, and A. Shaw. Document formatting systems: Survey, concepts and issues. *ACM Computing Surveys*, pp. 417-472, 1982.

Johari, R., J. Marks, A. Partovi, and S. Shieber. Automatic yellow-pages pagination and layout. Technical report, MERL, 1996.

Knuth, D.E. and Michael F. Plass. Breaking paragraphs into lines. Software—Practice and Experience, 11:1119-1184, 1981.

Peels, A.J.H.,Norbert T. M. Janssen, and Wop Nawijn. Document architecture and text formatting. *ACM Transactions on Information Systems*, 1985.

Weitzman, L. and Kent Wittenburg. Automatic presentation of multimedia documents using relational grammars. In *ACM Multimedia Conference Proceedings*, pp. 443-451, Oct. 1994.

Charfi, M., A. Nyeck, A. Tosser, "Focusing Criterion", Electronic Letters, vol. 27, No. 14, pp. 1233-1235.

Nanda, "Practical calibrations for a real-time digital omnidirectional camera", CVPR 2001 Technical Sketch, Kawai.

Official Notice of Rejection, English Translation, for JP Application No. 2003-177230, mailed Nov. 28, 2008.

European Search Report, Ref. No. EP36553TE900kap, for Application No. 05109683.2-1241/1659518, date Dec. 14, 2009.

Notice on First Office Action, for CN Application No. 200510118590.9, date Sep. 25, 2009.

Communication, Ref. EP36530RK900kap, for Application No. 05111765.3-2202, date Feb. 8, 2007.

Notice on First Office Action, for CN Application No. 200510127139.3, date Oct. 17, 2008.

Communication, Ref. EP36530RK900kap, for Application No. 05111765.3-2223, date Apr. 12, 2006.

* cited by examiner

SYSTEM AND METHOD FOR CAMERA CALIBRATION AND IMAGES STITCHING

CROSS-REFERENCE TO RELATED APPLICATIONS

This application is a continuation of Ser. No. 10/177,315 filed Jun. 21, 2002, now U.S. Pat. No. 7,259,784 entitled "A SYSTEM AND METHOD FOR CAMERA COLOR CALIBRATION AND IMAGE STITCHING".

BACKGROUND

1. Technical Field

This invention is directed toward a color calibration technique and a stitching technique for use with an omni-directional camera. More specifically, this invention is directed towards a system and method for improving the color uniformity of a composite image generated from a set of images depicting different but overlapping portions of the same scene. In addition, it includes a context-specific image stitching system and method that uses domain knowledge to improve the quality of image stitching.

2. Background Art

An image mosaic or panorama can be generated by aligning and "stitching" input images that are acquired from a single camera. To create an optimal panoramic stitched image, several types of color calibrations need to be taken into account. Differences in exposure, brightness, contrast and white balance can cause significant discontinuities between images. When acquiring the input images for a panorama from a single camera, the camera is adjusted to have as near as possible the same settings, including color settings, for all images acquired. Nevertheless, there are still sometimes differences in color between images because lighting and other conditions may change over the course of time and adjustments to settings may be necessary when photographing images from different angles or perspectives. Furthermore, even when all other conditions remain constant, settings can be inadvertently changed between pictures. As a result, when the input images are stitched together, the images can exhibit differences in color levels, making the edges or boundaries of the stitching in the composite image obvious to the viewer.

The problem of color differences between input images in a composite, mosaiced image is compounded when multiple cameras are used to acquire the input images. For example, this is the case when multiple cameras are used to generate a panoramic video. Essentially, the creation of a panoramic video entails acquiring multiple videos depicting a full 360-degree view of the surrounding scene. A camera rig, consisting of multiple cameras disposed in a back-to-back fashion, is sometimes employed for the purpose of capturing these videos. There is great difficulty in adjusting the settings of the multiple cameras used in this configuration to have exactly the same color settings. Although the parameters may be identically set, variations in Charge Coupled Devices (CCD), Analog to Digital (A/D) converters, and other analog components still cause significant image variations between cameras. As a result, the stitched or mosaiced composite image will often exhibit distinct "edges" where the different input images overlap due to the different colors of these images.

In addition, while the computer vision community had long ago recognized the importance of geometric calibration in accounting for geometric distortions, work on multi-camera radiometric calibration has been limited. Recently, much work has been done in the direction of geometric registration [3], in making panoramas generated by stitching individual images look seamless. In some cases the color uniformity is taken for granted, something that is not always true as discussed above. Others have used techniques to make the change gradual rather than abrupt, techniques known as feathering or blending [3]. Additionally, some research has been done to analyze, classify and correct photometric non-uniformities in and across tilted projectors [2]. The work that has been done in the field of radiometric calibration has mainly dealt with noise estimation and modeling [5, 4] or with single camera self calibration [1]. Radiometric distortion, the effects of lens vignetting, needs to be accounted for to ensure uniform intensity across panoramic images.

In addition to the problem of color differences, other factors affect the desired seamlessness of a mosaiced image. For example, when cameras are arranged in the back-to-back circular fashion discussed above and shown in FIG. 2, the center of projection in each camera is the point between the CCD and outer lens such that rotations about this point result in a pure rotation transformation on images captured (i.e., no motion parallax is induced). The distance between these centers of projection is labeled D. If D were zero, then stitching the images together is relatively easy. However, in some omni-directional camera configurations, D is much greater than zero, which results in motion parallax in the captured images. As a result, stitching the images together seamlessly requires knowing the depth from the cameras to the object being stitched. Computing reliable object depth with stereo image pairs is a very difficult problem, and has not been solved generally (for arbitrary objects, texture, lighting, etc.).

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The present invention is directed toward a system and process that overcomes the aforementioned limitations in systems for color calibration of images and image stitching.

In the color calibration technique according to the invention, digital camera controls are used to achieve images that are similar in color to start with. Seamless panoramic images can thus be stitched together, optionally applying standard blending techniques.

This general process of color calibrating a series of cameras can be described as follows. A reference camera is selected from the series of cameras. The brightness, contrast and white balance of the reference camera are set to optimum.

To do this, it is necessary to compute the optimum brightness for the reference camera. The sensor employed by most digital cameras is a charged coupled device (CCD) or a Complementary Metal-Oxide Semiconductor (CMOS). A typical CCD/CMOS sensor has a region of pixels that are blackened. This black region of the sensor is used to calibrate the brightness of the camera in real time. In the ideal case, one would show the camera an absolutely black scene and then adjust the brightness parameter to make the mean intensity of the image reach a value called "black value" (the criterion of being black). The "black value" could be empirically determined by using all brightness values until the image looks best. However, a more systematic method of determining the black value is to choose brightness equal to two times the standard deviation of the black reference region pixels in the CCD or CMOS and adjusting the camera brightness to this value. A less preferred way of adjusting brightness is to turn the shutter of the camera off (setting the exposure to zero) and adjusting the brightness to make the mean of any image observed in this state reach a value defined as black.

Once the optimum brightness is adjusted, the contrast of the reference camera is adjusted. This involves setting the contrast register at the camera to a user-specified value of mean brightness (e.g., typically as bright as possible without saturation).

Then the white balance is also set to optimum. White-balancing is performed to ensure that the color of a white object appears as white under different illumination conditions. To set the optimum white balance in the reference camera, the red and blue channel gains are adjusted to make the amount of red, green and blue in the scene equal (using the gray world assumption). An alternate way of adjusting the white balance is to allow a user to input an area that is white or to automatically detect a white region (e.g., a white board) and then to make the red, green and blue image content equal by adjusting the red and blue channel gains.

It should be noted that adjusting the contrast, brightness and white-balance as described above can be performed in any order.

Each camera in the series of cameras used has some overlap in the images captured with other adjacent cameras. Once the foregoing calibration actions have been accomplished for the reference camera, these optimum settings are propagated from the reference camera to the other cameras for the regions of image overlap. That is, the optimum settings are propagated from the reference camera (e.g., camera 1) to adjacent camera 2, from camera 2 to adjacent camera 3, camera 3 to adjacent camera 4, and so on, until the settings have been propagated through all of the cameras. The basic idea is to make the overlapping regions have the same white balance, brightness and contrast characteristics. The propagation process is continually repeated as the parameters of the reference camera may change over time or another camera in the series can be used as the reference camera.

The color calibration technique discussed above is advantageous in that it corrects the color in images before they are digitized, in real time. That is, the analog images are color corrected by the analog front end of the camera before being digitized. Additionally, since the technique requires very little processing it calibrates image color at very little Computer Processing Unit (CPU) cost. Besides saving CPU processing, superior image quality can be achieved because the color of the images are corrected before the signal is quantized (i.e., errors are corrected early in the process before they become compounded and exaggerated).

Vignetting is the radial drop of intensity as one moves away from the center of an image. The calibration technique outlined above, can also optionally be used to correct for this vignetting effect. This is done by determining a correction matrix that is then used to compensate for vignetting. New images are corrected by simply multiplying each pixel with the corresponding correction factor of the matrix. That is, all incoming images are multiplied by this correction matrix, thereby removing the vignetting effect.

Context specific stitching is then used to stitch the images together. This stitching method stitches images together seamlessly at a particular depth. For example, in a tested embodiment of the context-sensitive stitching system and process, a surface defined by the edge of a conferencing table was employed. A calibration pattern (a small array of LEDs) is used to define the stitching surface. More specifically, the LEDs are used to determine the scale and translation between cameras by providing point to point correspondence between images captured by adjacent cameras that are easy to compute. These parameters are then used to generate a mapping table, mapping corresponding pixels between the images captured in one camera and the adjacent camera(s) in the overlapping regions, i.e. a table listing the pixels of one camera and the corresponding pixels of the other camera(s). The mapping table speeds up processing as the pixel correspondences do not have to be recomputed each time. The result of the calibration is an image remapping function, which remaps a camera image into the panorama.

In context specific stitching, a series of mages is input. These images are then corrected for radial distortion. Each image is then mapped into a cylindrical coordinate system. Translation, rotation and scaling of each image are then used to align each image with its neighbors.

An image stitcher handles the overlap between cameras in two ways. The first and simplest method is to blend the images together (cross-fade), so that a sharp boundary is not as apparent. The main problem with this method is that objects that are not near the calibration surface, and therefore not stitched correctly, are blended together to create a "ghost" image of the object.

The second method can be applied if there is sufficient overlap between the cameras such that important objects (e.g., faces) are completely within both cameras' intersecting image. In this case, rather than blending the overlapping regions together, a minimum error path is used to splice the images together (with little or no blending along this path). The cut path is the path that minimizes the differences between the images, and is implemented using dynamic programming (Dijkstra's algorithm for finding minimum cost paths in a graph). If face detection information is available, then face regions are given an extra cost to prevent a path that divides a face between two cameras.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
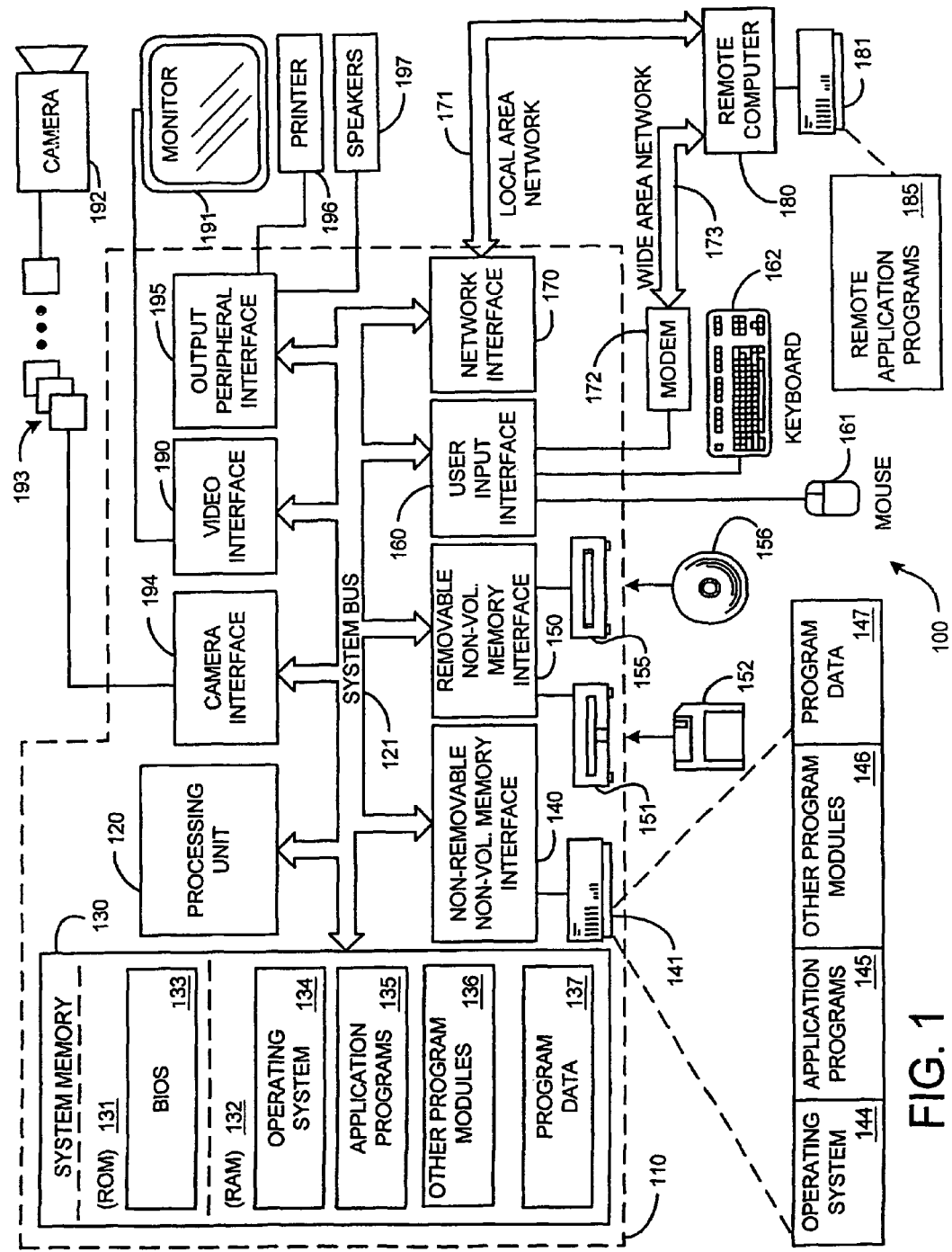
FIG. 1 is a diagram depicting a general purpose computing device constituting an exemplary system for implementing the invention.
Figure 2:
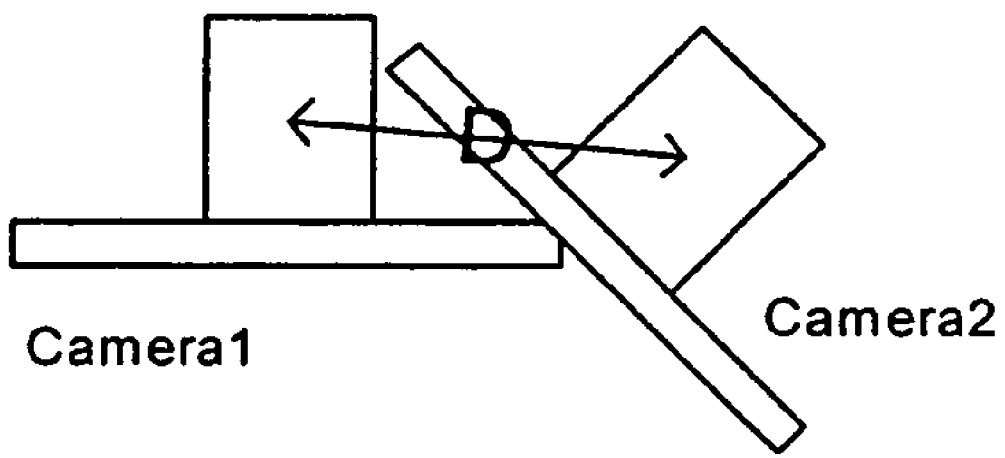
FIG. 2 is a diagram depicting the distance between the centers of projection between multiple cameras disposed in a ring-like fashion relative to each other.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as an input device to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention. An overall technique for producing mosaiced images without the aforementioned problems of previous image stitching methods is described. This technique uses color calibration, de-vignetting and context-sensitive stitching to provide seamless mosaiced images.

2.0 Color Calibration System and Method.

In this section, the system and method of color calibration according to the present technique are described.

2.1 Background and Overview of the Color Calibration System and Method

2.1.1 Background

Digital cameras have sensors that convert light into electrical charges. The image sensor employed by most digital cameras is a charge coupled device (CCD). The CCD is a collection of tiny light-sensitive diodes, called photosites, which convert photons (light) into electrons (electrical charge). Each photosite is sensitive to light—the brighter the light that hits a single photosite, the greater the electrical charge that will accumulate at that site. The accumulated charge of each cell in the image is read by the CCD thereby creating high-quality, low-noise images. Unfortunately, each photosite is colorblind, only keeping track of the total intensity of the light that strikes its surface. In order to get a full color image, most sensors use filtering to look at the light in its three primary colors, red, green and blue. The output of the multiple color filters are combined to produce realistic color images. Adjusting color in an image taken by a digital camera is typically done by adjusting the brightness, contrast and white balance settings.

2.1.2 Overview.

Figure 3:
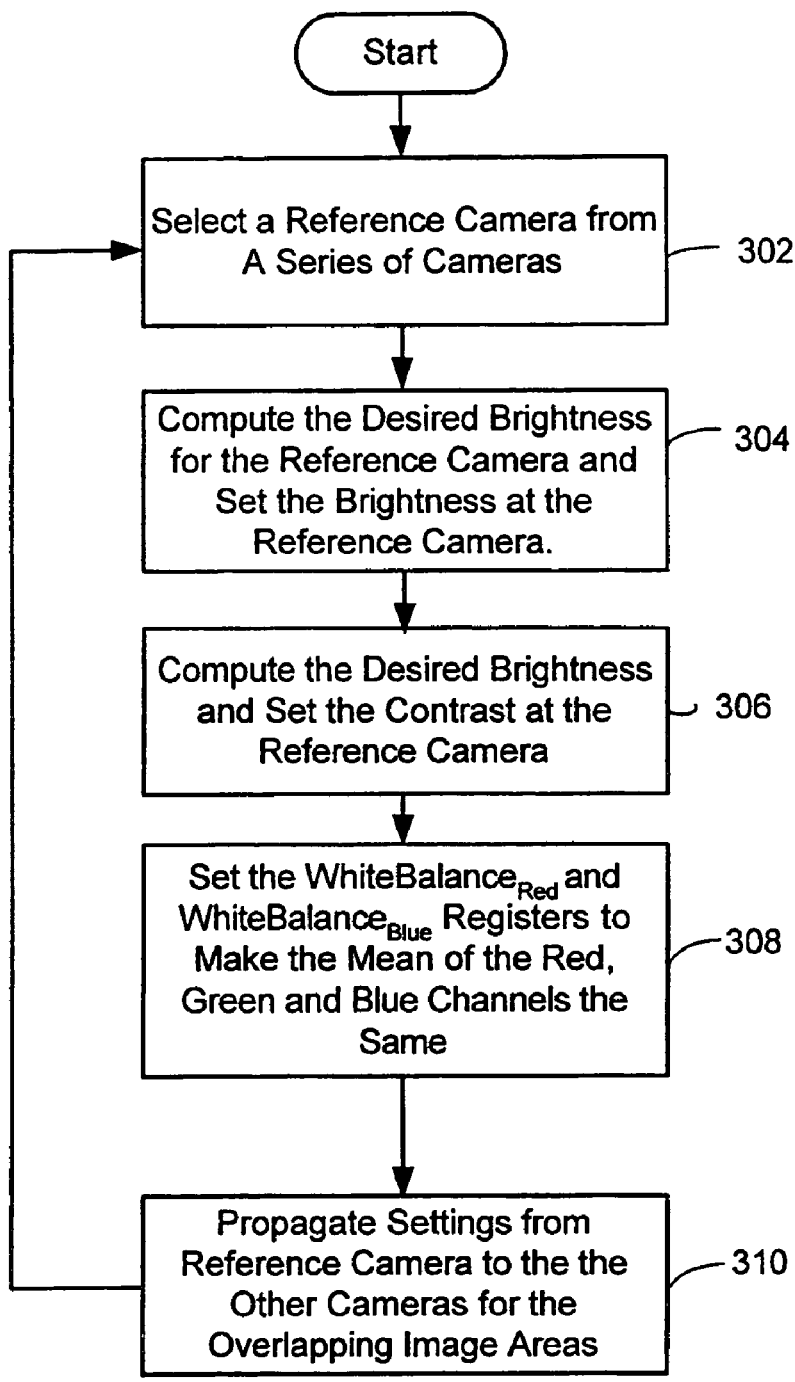
FIG. 3 is a flow chart depicting the overall process of color calibrating a series of cameras by the system and method according to the present invention.

As shown in FIG. 3, the general process of calibrating color in a series of cameras according to the present technique can be described as follows. A reference camera is selected from a series of cameras, as shown in process action 302. The reference camera is adjusted to set its brightness, contrast and white balance to optimum. To do this, the optimum brightness is computed and set for the reference camera (process action 304). This is done by using the black reference pixels defined in the CCD/CMOS of a typical digital camera. The black value for the reference camera is determined by choosing brightness equal to two times the standard deviation of the black pixels region. The brightness is adjusted to make the mean of the black region equal the black value. An alternate method to adjust the brightness it to turn off the shutter of the camera (setting the exposure to zero) and then adjusting the brightness to make the mean brightness of any image observed reach a prescribed value defined as black. As shown in process action 306, the optimum contrast of the reference camera is also computed and set. This typically involves setting the contrast register at the camera to a user-specified value of mean brightness (e.g., typically as bright as possible without saturation). Then the white balance of the reference camera is also set to optimum. White-balancing is performed to keep the color of a white object white under different illumination conditions. To do this, the red and blue channel gains are adjusted to make the means of the red, green and blue components in the scene equal (using the gray world assumption) (process action 308). An alternate way of adjusting the white balance in the reference camera is to allow a user to input an area that is white, or to automatically detect a white object or area, and then attempt to make the red, green and blue content equal by adjusting the red and blue channel gain. It should be noted that adjusting the contrast, brightness and white-balance as described above can be performed in any order.

Each camera in the series of cameras used has some image overlap with other adjacent cameras. Once the foregoing calibration actions for obtaining the optimum settings for the reference camera have been accomplished, these optimum settings are propagated from the reference camera to the other cameras for the regions of overlap, as shown in process action 310. That is the optimum settings are propagated from the reference camera (e.g., camera 1) to adjacent camera 2, from camera 2 to adjacent camera 3, camera 3 to adjacent camera 4, and so on, until the settings have been propagated through all of the cameras. The basic idea is to make the overlapping regions have the same white balance, brightness and contrast characteristics. The propagation process is continually repeated as the parameters of the reference camera may change or it can be decided that another of the cameras should be the reference camera.

Vignetting is the radial drop of intensity as one moves away from the center of the image. As will be explained shortly, the color calibration technique outlined above, can also optionally correct for this vignetting effect. This is done by determining a generic correction matrix is used to compensate for vignetting. New images are corrected by simply multiplying each pixel with the corresponding element of the correction matrix. That is, all incoming images are multiplied by this correction matrix, thereby removing the vignetting effect.

The overall calibration system and method having been generally described, the following paragraphs provide details.

2.1.3 Determining Focus

It is assumed that the cameras have an auto-focus feature so the best focus need not be determined. However, if the cameras do not have the auto-focus feature, as in tested versions, the following focus feature can be employed.

A common approach to focus is used, where a measure which exhibits a maximum when the image is at best focus, is defined. Some examples of focus measures that have been considered in the literature are: 1) variance of pixel values, 2) energy of the image gradient and 3) self-entropy of the phase of the Fourier transform. In the present color calibration technique, contrast has been chosen as the measure of focus. A focused camera gives sharp images hence the output image has a high contrast. A search is made through the range of possible focal lengths, and when the optimal position producing the highest contrast is found the focus is set to this focal length.

The measure of contrast of an image used is the absolute difference of a pixel with its eight neighbors, summed over all the sub-images of the image. The positive features of this focus measure are that it exhibits a sharp and well defined peak at the position of best focus, it decreases monotonically as the de-focus increases and it is resistant to noise in the image and hence is not very sensitive to small changes in the scene. The fact that the measure decreases monotonically allows an easy implementation of an intelligent search procedure to find the best focus.

The technique provides both the contrast value at an instant and also the direction (focusing or de-focusing) in which the focus is going. Thus, one can either look for the point where the contrast is maximum or else the point where the system shifts from the focusing to de-focusing mode, indicating that the system after reaching the best focus is now starting to de-focus. This provides an objective measure of focus rather than a subjective measure which one gets when trying to find the state of the focus using one's naked eye. When focusing needs to be performed for different cameras, a subjective measure of focus is not sufficient to use the cameras together. To add to its utility, the technique allows the user to choose a region of interest that is used for focusing.

2.1.4 Determining Optimum Brightness Setting

The relation between the observed pixel value $I(x;y)$ at any given point, the brightness b, contrast c and the accumulated charge on the CCD $i(x;y)$ can be expressed as $$I(x,y) = b + ci(x,y) \qquad (1)$$

The brightness parameter b is the offset that is provided to the intensity at each pixel. In other words, if the camera looks at an "absolutely black" object, it still will not have an absolute zero pixel value, but a non-zero value equal to the brightness setting. Thus, by adjusting brightness one is actually adjusting what a black object will appear as in an image. In the ideal case, one would show the camera an absolutely black scene and then adjust the brightness parameter to make the mean intensity of the image reach a value called "black value" (the criterion of being black). The "black value" could be empirically determined by using all brightness values until the image looks best. However, a more systematic method of determining the black value is to choose brightness equal to two times the standard deviation of the black reference region pixels in the CCD or CMOS. Another, albeit more impractical, way of accomplishing this task is to simulate a black scene by setting the exposure of the camera to zero and then adjusting the brightness in order to make the mean of the image reach the "black value".

2.1.5 Determining Optimum Contrast Setting

The contrast parameter, c as shown in Equation (1), controls the gain that is provided to the input pixel values. In other words, it is the scale factor applied to the input before it is offset by the brightness. Thus, in effect, contrast decides the mean intensity of the image, and hence the dynamic range. The color calibration technique of the invention adjusts the contrast so as to make the mean close to a user-specified value "mean brightness". In a tested embodiment of the invention, the default value for the mean brightness was 127, which gives the maximum dynamic range to the pixel values. This parameter can be changed by the user to meet the needs of any particular application.

2.1.6 Determining the Optimum White Balance Setting

White balancing is done to keep the color of a white piece of paper or other white objects the same under different illuminants (e.g., sunlight or incandescent light).

In the case of RGB cameras, the cameras allow control of red and blue gain to perform white balance, which are the gain values that are applied to the red and blue channels. Thus, by adjusting these values, an attempt is made to make a white object appear white in the output of the camera. To be able to perform white balancing dynamically, without any input from the user, the Gray World Assumption is used. The Gray World Assumption states is that, given a scene with sufficient amount of color variations, the average value of the red, green, and blue components of the image should average out to a common gray value (i.e., mean(red) components=mean (blue) components=mean(green) components). The Gray World Assumption holds for most real life scenes. Thus, to adjust the white balance, using the gray world assumption, the mean value of the green components, mean of blue components and mean of the red components in the scene are made equal, by adjusting the two parameters, red gain and blue gain. Another way one can perform white balancing is to automatically select, or allow a user to select, an area which is white and then attempt to make the red, blue and green content of that patch equal by adjusting the two white balance parameters (red gain and blue gain). A similar procedure as discussed for RGB cameras can be used for YUV cameras by changing the U and V parameters.

In a working embodiment of the present invention, the red and blue gains are adjusted using camera control commands available via a 1394 bus and 1394 camera specification. If the mean of the blue in the scene is less than the mean of green in the scene, the blue gain is incremented. If the mean of the blue is greater than the green, then the blue gain is decremented. This process is repeated until the absolute value of the difference between the mean of blue and the mean of green is less than a prescribed threshold. The process is similar for the red gain. The procedure described here can use a binary search to speed up the search, rather than the linear search described here.

2.1.7 Vignetting

Figure 4:
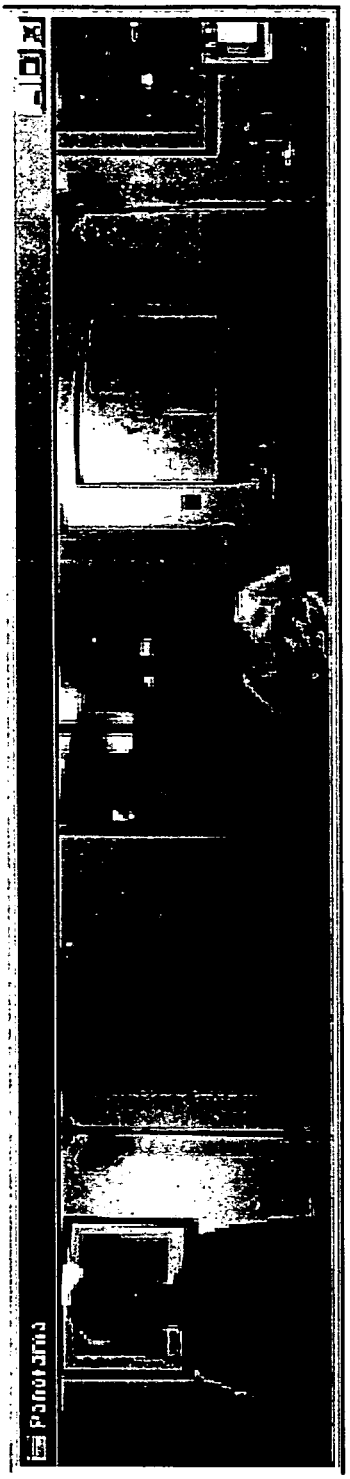
FIG. 4 is an image showing vignetting effects.

Vignetting is the radial drop of intensity as one moves away from the center of the image. If an object were a plane of uniform brightness exactly perpendicular to the optical axis, the illuminance of its image can be observed to fall off with distance away from the image center. In most compound lenses vignetting also increases with the aperture size [1]. Also, from FIG. 4, it can be seen that lenses with high field of view show stronger vignetting effects In some cameras, the vignetting effect is not symmetric around any axis and no parametric function fitting the fall off can be found. This can sometimes be attributed to the lens mount not being properly centered or other manufacturing errors. In such cases, a generic correction matrix can be used to compensate for vignetting. To determine this matrix, several images of a uniformly lit white surface P are taken and averaged. The correction matrix elements are $C_{i,j} = P_{cx,xy}/P_{i,j}$, where $P_{cx,xy}$ is the value at the center of P. New images are corrected by simply multiplying element-wise with C. A filter is used which multiplies all incoming images with this correction matrix, thereby removing the vignetting effect.

Figure 5:
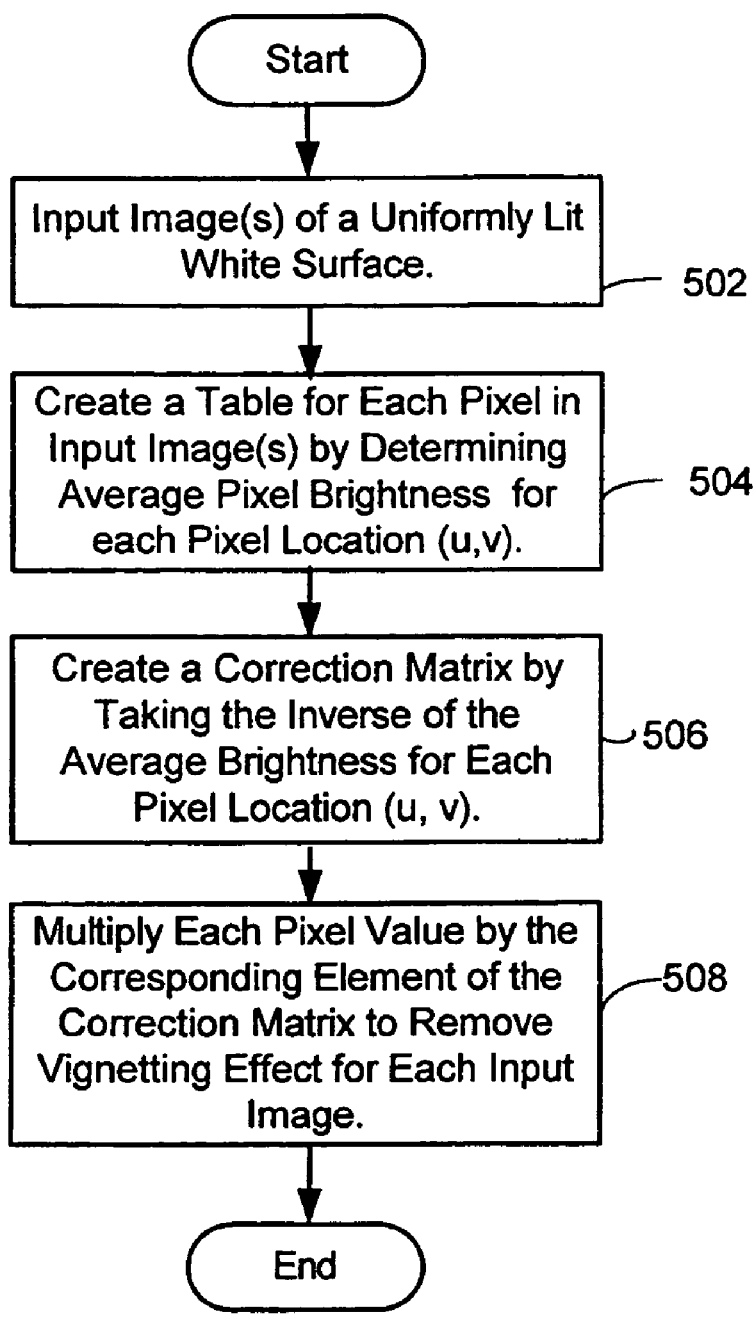
FIG. 5 is a flow chart depicting the process of devignetting an image by the system and method according to the present invention.

More specifically, the process used for devignetting is shown in FIG. 5. One or more images of a uniformly lit white surface are input (process action 502) These images are preferably the same size as the expected input images. A table is then created for each pixel in the input image(s) by determining average pixel brightness for each pixel location (u,v) in the input image(s) (process action 504). A correction matrix is then created by taking the inverse of the average brightness for each pixel location (u,v) (process action 506). Each pixel value is then multiplied by the corresponding correction matrix element to remove the vignetting effect for each image that is input subsequently (process action 508). A uniformly lit surface is the result, as the correction matrix basically provides a gain value for each pixel to correct for vignetting.

It should be noted that it is possible to correct each input image for vignetting at the same time it is stitched into any panorama or mosiac. This is true because the input image coordinates are known with respect to the global coordinates, and thus the corresponding gain value applied to each pixel can be applied to correct for vignetting at the time the input image is stitched into the panorama.

2.2 Propagation of Parameters

A panorama is made out of images taken from the different cameras. Hence, the cameras should not only be color calibrated independently, but should also be mutually color calibrated. This is to ensure that their output looks alike and there is a radiometric uniformity across cameras. Any one camera is chosen as the reference camera, which can be changed dynamically. This reference camera is color calibrated using the methods mentioned above. Each camera has some overlap with the adjacent cameras. The basic idea is to make the overlapping regions have the same white balance, brightness and contrast characteristics. Thus, using just the overlapping region, the camera settings are adjusted for the neighboring camera and this change is propagated down the chain to the last camera on each side of the reference camera. This processes is continuously repeated, as the reference camera may change its parameters (e.g., due to lighting changes or object motion) or the reference camera itself may change.

2.2.1 White Balance Propagation

For white balance propagation, the camera parameters of the camera currently being calibrated are adjusted so as to make the ratio of red and green and the ratio of blue and green to be the same for the region of overlap between the current camera and the reference camera. In the reference camera, for the strip that overlaps with the current camera (i.e., the camera for which the white balance parameters have to be set) the mean of red, blue and green components is calculated. For the unadjusted camera, the red and blue gains are adjusted. If the mean of the blue in the scene is less than the mean of green in the scene, the blue gain is incremented. If the mean of the blue is greater than the green, then the blue gain is decremented. This process is repeated until the absolute value of the difference between the mean of blue and the mean of green is less than a prescribed threshold. The process is similar for the red gain. The procedure described here can use a binary search to speed up the search, rather than the linear search described here. It is noted that the green gain could also be adjusted by changing the contrast setting of the camera. However, this would also change the red and blue gain, thus complicating the balancing process. It is further noted that propagating the white balance using the red to green and blue to green ratios is advantageous in that the white balance can be adjusted even if the contrast (i.e., overall gain) is incorrect.

2.2.2 Contrast Propagation

The basic idea for contrast propagation is same as that for white balance propagation, i.e., to adjust contrast parameter for the current camera in order to make the contrast in the overlapping strips of the current camera and the reference camera the same. For contrast, the measure is the average intensity of the overlapping strip. The mean intensity on the strip on the reference camera is calculated and then, by adjusting the contrast for the next camera, the average intensity on its corresponding strip is made equal to that of the reference camera.

2.2.3 Brightness Propagation

Similar to that discussed for contrast and white balance propagation, brightness can also be corrected by changing brightness for the overlapping regions. That is, brightness parameters are changed such that the image mean is the same in the overlapped regions between cameras. The optimum brightness settings are propagated from the reference camera (e.g., camera 1) to adjacent camera 2, from camera 2 to adjacent camera 3, camera 3 to adjacent camera 4, and so on, until the settings have been propagated through all of the cameras. It should be noted, however, that it is possible for each camera to set its own white balance, contrast and brightness settings, if a decision is made not to propagate one of these settings for the whole camera array.

2.3 Color Calibration Results

Figure 6:
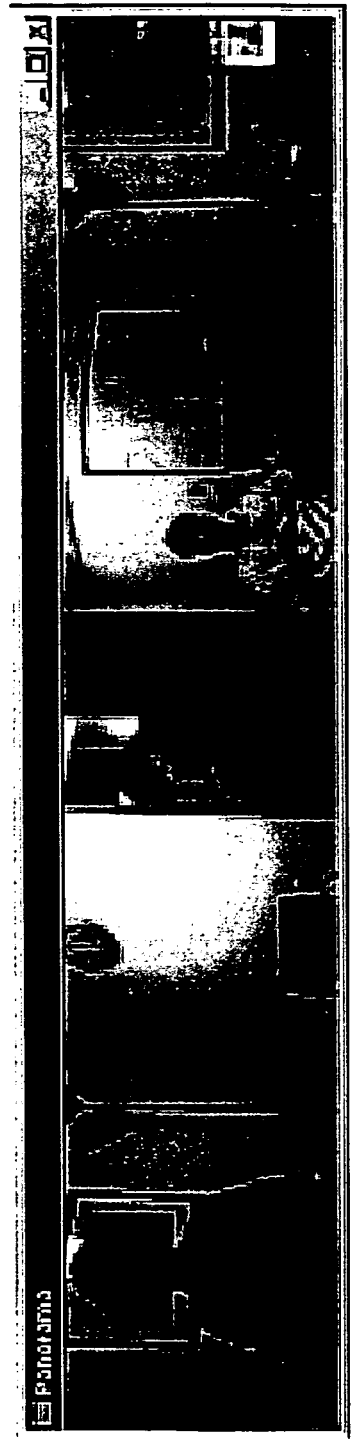
FIG. 6. shows the panorama depicted in FIG. 2 after the application of the color calibration technique of the system and method according to the present invention including devignetting.

FIG. 3 shows a panorama before color calibration has been performed, where each camera was configured back to back in a ring configuration. In this image, each of the cameras performed white balance, contrast and brightness adjustments independently. FIG. 6 shows the same camera rig's panorama after the application of the color calibration technique discussed herein including devignetting. The panorama shown in FIG. 6, is greatly improved over FIG. 4.

3.0 Image Stitching System and Method

3.1 Overview.

The context specific image stitching system and method according to the present invention stitches images together seamlessly at a particular depth. A calibration pattern (a small array of LEDs) is used to define the stitching surface. The result of the calibration is an image remapping function, which remaps a camera image into the panorama. The remapping function is optimized using conventional SIMD operations, and pixel interpolation techniques (e.g., nearest neighbor, bilinear or bicubic).

An image stitcher can handle the overlap between cameras in two ways. The first and simplest method is to blend the images together (cross-fade), so that a sharp boundary is not as apparent. The main problem with this method is that objects that are not near the calibration surface, and therefore not stitched correctly, are blended together to create a "ghost" image of the object.

The second method can be applied if there is sufficient overlap between the cameras such that important objects (e.g., faces) are completely within both cameras' intersecting image. In this case, rather than blending the overlapping regions together, a minimum error path is used to splice the images together (with little or no blending along this path). The cut path is the path that minimizes the differences between the images, and is implemented using dynamic programming (Dijkstra's algorithm for finding minimum cost paths in a graph). If face detection information is available, then face regions are given an extra cost to prevent a path that divides a face between two cameras.

Figure 7:
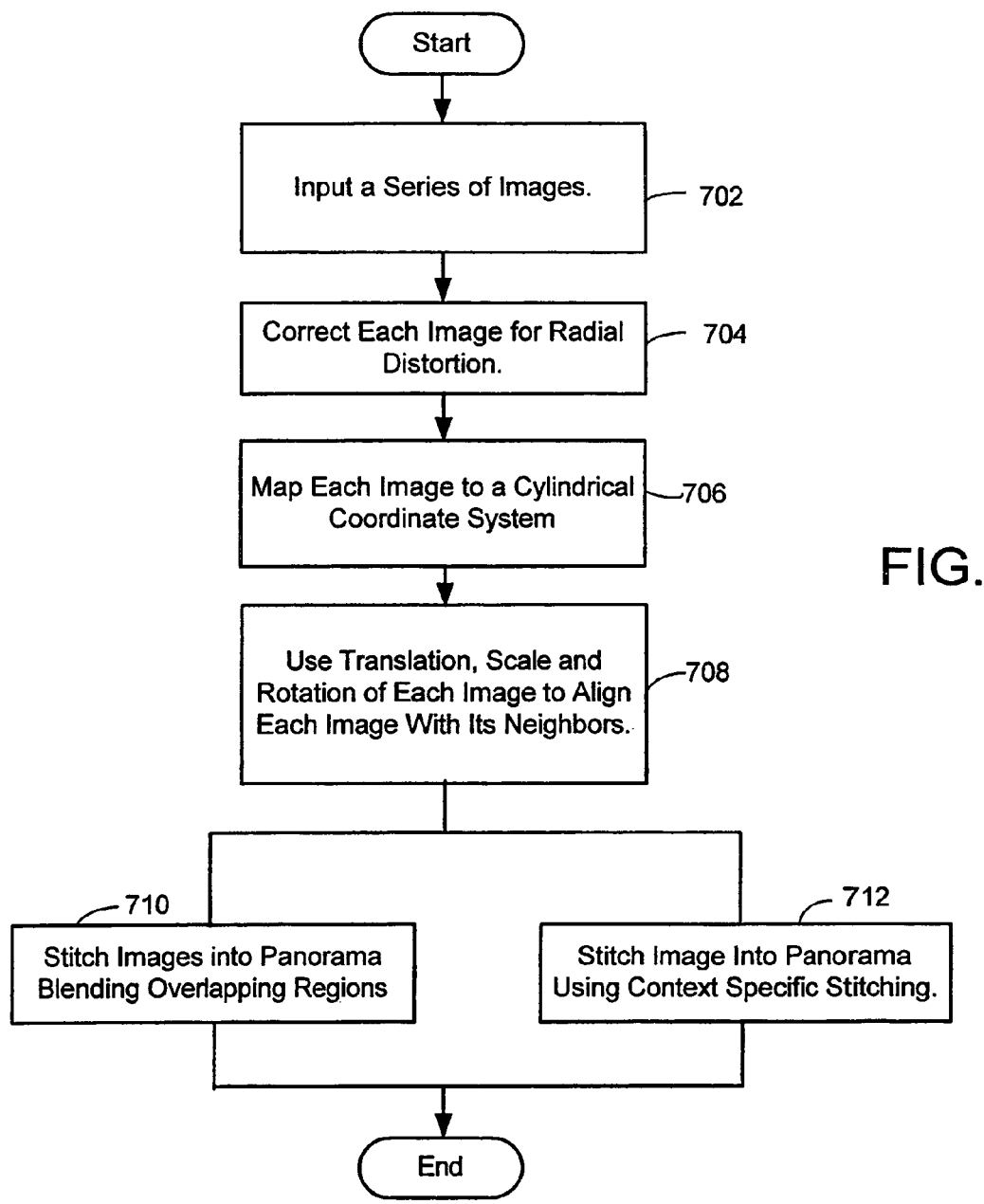
FIG. 7 is a flow chart depicting the stitching process of the system and method according to the present invention.

More specifically, the stitching process is shown in FIG. 7. A series of images depicting different portions of the same scene are input (process action 702). These images are then corrected for radial distortion (process action 704). Each image is then mapped into a cylindrical coordinate system (process action 706). Translation, rotation and scaling of each image is then used to align each image with its neighbors (process action 708). At this point, overlapping regions are blended or feathered for all images (process action 710). Alternately, context-specific stitching is used to stitch the images together (process action 712).

3.2 Correcting for Radial Distortion

Geometric distortion is a major problem with optical components. Pixels are severely distorted along the edges of images, and these are the most important pixels when stitching is performed. The general approach to the distortion problem is to model the distortions in the lens system and to correct for them in the images obtained. In the present stitching system and method, any conventional method can be used to correct for radial distortion.

3.3 Mapping to Cylindrical Coordinate System

Once the input images are corrected for radial distortion, the images are mapped to a global cylindrical coordinate system by conventional methods. The stitched composite image is typically represented by the given set of input images and a set of associated transformations. Each transformation corresponds to one image in the input image sequence and represents the mapping between image pixels in each image and the global cylindrical coordinate system. See [3]. It should be noted that any global coordinate system can be used to map the individual images into the panorama.

3.4 Translation, Rotation and Scaling of Each Image to Align for Stitching into Panorama or Mosaic The images are then aligned with their neighboring images in orientation. This typically poses no problem since the coordinates of all pixels in each input image are known relative to the same global coordinate system. Regions of overlap are then found for each image, using the pixel locations in the global coordinate system. The images to the left and right of the center image are then warped to the coordinate frame of the center image, minimizing the differences between the images in the overlapping regions. This allows the corresponding pixel locations in the left and center images, and the corresponding pixel locations in the right and center images to be determined for the overlapping areas. At this point the input images are ready to be stitched into the panorama by using the global coordinate system.

3.5 Stitching Input Images into the Panorama or Mosaic

3.5.1 Stitching Using Blending of Transitions Between Overlapping and Non-Overlapping Image Regions As the images are stitched into the panorama, it is possible to improve the uniformity of the mosaiced image by blending the transitions between overlapping and non-overlapping input image regions to hide the edges of the component images. Preferably this blending can be accomplished using any conventional feathering algorithm such as that described in [6]. Using this feathering algorithm the luminance value of the pixels in each image are weighted proportionally to their distance to the edge of the overlapping region. This is done by using a weighted average with pixels near the center of each image contributing more to the final composite. The weighting function is a simple bilinear function that goes to zero at both edges of the image.

3.5.2 Context-Specific Stitching

If there is sufficient overlap between the cameras such that important objects (e.g., faces) are completely within both cameras' intersecting image, rather than blending the overlapping regions together, Dijkstra's algorithm is used in finding the cut path.

3.5.2.1 Diikstra's Algorithm

Dijkstra's algorithm determines the distances (costs) between a given vertex (a point or node on a graph) and all other vertices in a graph (a set of vertices and a set of edges). The algorithm begins at a specific vertex and extends outward within the graph, until all vertices have been reached. Dijkstra's algorithm stores the total cost from a source vertex to the current vertex. More simply, Dijkstra's algorithm stores a summation of minimum cost edges.

3.5.2.2 Determining Cut Edge

Dijkstra's algorithm is used to assign a cost to each pixel in the overlapping region of two adjacent images. The cutting edge between the two images is then determined by drawing a path through the pixels that minimizes the overall cost for the height of the stitched area. By setting the cutting edge between the two images as the minimum cost line, high value objects, such as for example faces, will not be cut in half, as the cutting edge will go around the face to keep all pixels related to it from one image. Little or no blending or feathering will be performed around the high cost areas. For example, there might be feathering in width of only two or three pixels around the cutting edge in areas that are high cost.

Figure 8:
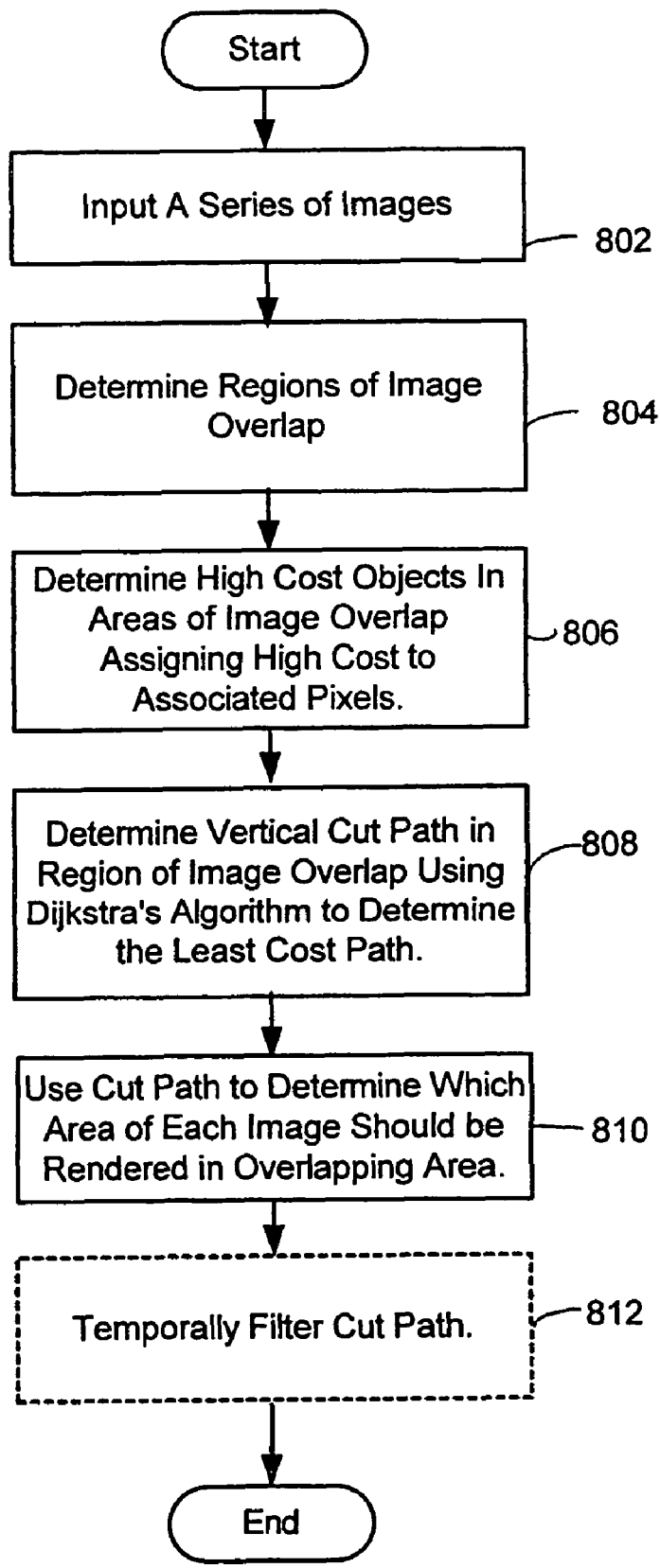
FIG. 8 is a flow chart depicting the details of context-sensitive stitching.

More specifically, as shown in FIG. 8, a series of images are input (process action 802). Regions of image overlap are then determined (process action 804). High cost objects, such as faces, are then determined, as will be discussed shortly, and high costs are assigned to the pixels associated with these high cost objects (process action 806). A vertical cut path is then determined in the region of overlap using Dijkstra's algorithm to determine the least cost path (process action 808). The cut path is used to determine which area of each image is to be rendered in the overlapping area (process action 810). Optionally, the cut path can also be temporally filtered, so that it changes smoothly as a function of time (process action 812). This helps to minimize "flicker" if there are two similar cuts.

3.5.2.3 Using a Face Detector to Identify Faces in the Image Overlap Regions If face detection information is available, then face regions are given an extra cost to prevent a path that divides a face between two cameras. Any one of a number of face detectors may be used to identify faces in the overlap regions of the input images. In a preferred embodiment the face detector described in [7] is used to detect faces. Once the faces are found and their corresponding pixels are identified in the global cylindrical coordinate system discussed previously, high costs are assigned to each of the pixels associated with each face found. Since high costs are associated with each pixel, the cut line between in the overlapping regions of adjacent images is placed so it goes around any face pixels.

3.6 Stitching Results

In a tested camera rig embodiment, with a distance between camera centers of projection (D) equal to 45 mm, objects were perfectly stitched (within the resolution limits of the camera) if they were within 2 cm of the stitching surface. In the another embodiment, with D=23 mm, objects were perfectly stitched if they were within 50 cm of the stitching surface.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] S. B. Kang, R. Weiss, "Can We Calibrate a Camera using an Image of a Flat, Textureless Lambertian Surface", ECCV, 2000.
[2] A. Majumder, Z. He, H. Towles, G. Welch, "Achieving Color Uniformity Across Multi-Projector Displays", IEEE Visualization 2000.
[3] R. Szeliski and H. Shum, "Creating Full View Panoramic Image Mosaics and Environment Maps", Computer Graphics (SIGGRAPH '97), pp. 251-258, 1997.
[4] G. Kemberova, R. Bajcsy, "The Effect of Radiometric Correction on Multicamera Algorithms" Technical Report MS-CIS-97-17, 1997.
[5] Edited by H. John Durrett, Interactive Systems Laboratory, San Marcos, Tex., *Color and Computer*, Academic Press, INC, 1986.
[7] E. Glenn, Healey, K. Raghava, "Radiometric CCD Camera Calibration and Noise Estimation", IEEE Trans. PAMI, 16(3):267-276, 1994.
[6] R. Szeliski. Video Mosaics for Virtual Environments, IEEE Graphics and Applications, 16(2): 22-30, March 1996.
[7] Li, Zhang, Zhang. "Real-Time Multi-view Face Detection", Face and Gesture Recognition, 2002, Washington D.C.

Wherefore, what is claimed is:

1. A method for color calibrating a series of cameras capturing different portions of a scene, the method comprising:
   selecting a first of a plurality of cameras as a reference camera, wherein each of the plurality of cameras is configured to capture different portions of the scene;
   calibrating color component mean values of the reference camera by adjusting color settings of the reference camera, wherein the calibrated color component mean values of the reference camera are based on a first overlapping portion of the scene as captured by the reference camera, and wherein a second camera of the plurality of cameras is configured to capture the first overlapping portion of the scene and a second overlapping portion of the scene;
   adjusting color settings of the second camera, in response to the calibrating, to cause color component mean values of the second camera to substantially match the calibrated color component mean values of the reference camera, wherein the adjusting the color settings of the second camera is based on the first overlapping portion of the scene as captured by the second camera.

2. The method of claim 1 further comprising:
   continually automatically recalibrating the reference camera; and
   propagating, in response to the continually automatically recalibrating, any changes in the reference camera by the adjusting the color settings of the second camera and the adjusting the color settings of a third camera.

3. The method of claim 1 wherein a different camera of the plurality of cameras other than the first camera is selected as the reference camera.

4. The method of claim 1 wherein the calibrating further comprises calibrating a mean intensity value by adjusting brightness settings of the reference camera, wherein the calibrated mean intensity value of the reference camera is based on the first overlapping portion of the scene as captured by the reference camera.

5. The method of claim 4 wherein the calibrating the mean intensity value of the reference camera comprises adjusting the brightness settings to cause the mean intensity value to substantially match a black reference value.

6. The method of claim 5 wherein the black reference value is determined by a black reference pixel region in the reference camera.

7. The method of claim 4 wherein the calibrating the mean intensity value of the reference camera comprises:
   setting an exposure setting of the reference camera to zero; and
   adjusting the brightness settings to cause the mean intensity value to substantially match a black reference value.

8. The method of claim 1 wherein the calibrating further comprises calibrating a mean brightness value by adjusting contrast settings of the reference camera, wherein the calibrated mean brightness value of the reference camera is based on the first overlapping portion of the scene as captured by the reference camera.

9. The method of claim 8 wherein the calibrating the mean brightness value of the reference camera comprises adjusting the contrast settings to cause a mean brightness value of the first overlapping portion of the scene to substantially match a prescribed value.

10. The method of claim 8 wherein the calibrating the mean brightness value of the reference camera comprises adjusting the contrast settings to cause a substantially maximum brightness value without saturation.

11. The method of claim 1 wherein the calibrating further comprises calibrating a red mean value and a blue mean value and a green mean value by adjusting a red gain setting of the reference camera and a blue gain setting of the reference camera, wherein the calibrated red and blue and green mean values of the reference camera are based on the first overlapping portion of the scene as captured by the reference camera.

12. The method of claim 11 wherein the calibrating the red mean value and the blue mean value and the green mean value of the reference camera comprises adjusting the red gain value and a blue gain value to cause the mean red value and the mean blue value and the mean green value to be substantially equal.

13. The method of claim 12 wherein the calibrating the red mean value and the blue mean value and the green mean value of the reference camera comprises:
   capturing, by the reference camera, a white scene;
   adjusting the red gain value and a blue gain value to cause the mean red value and the mean blue value and the mean green value to be substantially equal based on the white scene as capture by the reference camera.

14. The method of claim 1 further comprising adjusting color settings of a third camera of the plurality of cameras, in response to the adjusting the color settings of the second camera, to cause color component mean values of the third camera to substantially match color component mean values of the second camera that are based the adjusted color settings of the second camera and that result from the second overlapping portion of the scene as captured by the second camera, wherein the third camera is configured to capture at least the second overlapping portion of the scene, and wherein the adjusting the color settings of the third camera is based on the second overlapping portion of the scene as captured by the third camera.

15. At least one computer-readable device that comprises computer-executable instructions that, when executed by a computer, cause the computer to perform a method for color calibrating a series of cameras capturing different portions of a scene, the method comprising:
   selecting a first of a plurality of cameras as a reference camera, wherein each of the plurality of cameras is configured to capture different portions of the scene;
   calibrating color component mean values of the reference camera by adjusting color settings of the reference camera, wherein the calibrated color component mean values of the reference camera are based on a first overlapping portion of the scene as captured by the reference camera, and wherein a second camera of the plurality of cameras is configured to capture the first overlapping portion of the scene and a second overlapping portion of the scene; and
   adjusting color settings of the second camera, in response to the calibrating, to cause color component mean values of the second camera to substantially match the calibrated color component mean values of the reference camera, wherein the adjusting the color settings of the second camera is based on the first overlapping portion of the scene as captured by the second camera.

16. The computer-readable device of claim 15, the method further comprising adjusting color settings of a third camera of the plurality of cameras, in response to the adjusting the color settings of the second camera, to cause color component mean values of the third camera to substantially match color component mean values of the second camera that are based the adjusted color settings of the second camera and that result from the second overlapping portion of the scene as captured by the second camera, wherein the third camera is configured to capture at least the second overlapping portion of the scene, and wherein the adjusting the color settings of the third camera is based on the second overlapping portion of the scene as captured by the third camera.

17. The computer-readable device of claim 15, the method further comprising:
   continually automatically recalibrating the reference camera; and
   propagating, in response to the continually automatically recalibrating, any changes in the reference camera by the adjusting the color settings of the second camera and the adjusting the color settings of a third camera.

18. The computer-readable device of claim 15 wherein a different camera of the plurality of cameras other than the first camera is selected as the reference camera.

19. The computer-readable device of claim 15 wherein the calibrating further comprises calibrating a mean intensity value by adjusting brightness settings of the reference camera, wherein the calibrated mean intensity value of the reference camera is based on the first overlapping portion of the scene as captured by the reference camera.

20. The computer-readable device of claim 15 wherein the calibrating further comprises calibrating a mean brightness value by adjusting contrast settings of the reference camera, wherein the calibrated mean brightness value of the reference camera is based on the first overlapping portion of the scene as captured by the reference camera.

21. The computer-readable device of claim 15 wherein the calibrating further comprises calibrating a red mean value and a blue mean value and a green mean value by adjusting a red gain setting of the reference camera and a blue gain setting of the reference camera, wherein the calibrated red and blue and green mean values of the reference camera are based on the first overlapping portion of the scene as captured by the reference camera.

* * * * *